United States Patent
Deskevich

(10) Patent No.: US 11,410,313 B2
(45) Date of Patent: Aug. 9, 2022

(54) METHOD AND SYSTEM FOR FAST APPROXIMATE REGION BISECTION

(71) Applicant: Eagle Technology, LLC, Wilmington, DE (US)

(72) Inventor: Michael Deskevich, Boulder, CO (US)

(73) Assignee: Harris Geospatial Solutions, Inc., Broomfield, CO (US)

( * ) Notice: Subject to any disclaimer, the term of this patent is extended or adjusted under 35 U.S.C. 154(b) by 53 days.

(21) Appl. No.: 16/852,555

(22) Filed: Apr. 20, 2020

(65) Prior Publication Data

US 2020/0242775 A1 Jul. 30, 2020

Related U.S. Application Data

(63) Continuation of application No. 15/934,898, filed on Mar. 23, 2018, now Pat. No. 10,685,442.

(51) Int. Cl.
*G06T 7/11* (2017.01)
*G06T 11/60* (2006.01)
*G06T 7/136* (2017.01)

(52) U.S. Cl.
CPC ............... *G06T 7/11* (2017.01); *G06T 7/136* (2017.01); *G06T 11/60* (2013.01)

(58) Field of Classification Search
CPC . G06T 7/11; G06T 11/60; G06T 7/136; G06T 11/00; G06F 2111/10; G06F 30/00
USPC ........................................................ 382/173
See application file for complete search history.

(56) References Cited

U.S. PATENT DOCUMENTS

| | | | | |
|---|---|---|---|---|
| 5,913,082 A | * | 6/1999 | Onoda | G02B 7/34 396/128 |
| 6,067,164 A | * | 5/2000 | Onoguchi | H01J 37/265 250/310 |
| 2007/0242876 A1 | * | 10/2007 | Sabe | G06K 9/6203 382/165 |
| 2010/0027883 A1 | * | 2/2010 | Thomas | H04N 19/119 382/166 |
| 2011/0069881 A1 | * | 3/2011 | Kitago | G06T 9/001 382/164 |
| 2011/0148872 A1 | * | 6/2011 | Kitago | G06T 11/00 345/419 |
| 2018/0007343 A1 | * | 1/2018 | Send | H04N 13/218 |
| 2020/0302603 A1 | * | 9/2020 | Barnes | G06T 7/0012 |

* cited by examiner

*Primary Examiner* — Ali Bayat
(74) *Attorney, Agent, or Firm* — Kiklis and Clark, PLLC

(57) ABSTRACT

Methods and systems in accordance with the present invention automatically subdivide an area having an arbitrary shape into multiple sub-regions that have approximately equal area under a threshold, with compact shapes having minimal perimeter length. These systems input an arbitrarily shaped zone and recursively bisect it until all of the new sub-zones are smaller than a particular threshold. A data processing system subdivides a two-dimensional region, such as a digital image of a landmass. The data processing system loads the region into memory, determines a minor axis of the region, and splits the region along the minor axis into a first sub-region and a second sub-region. The sub-regions are evaluated to determine if they are under the threshold area. The steps of the process are repeated until all resulting sub-regions are under the threshold area. Consistently compact sub-regions with minimal perimeter are achieved by splitting along the minor axis.

16 Claims, 18 Drawing Sheets

METHOD AND SYSTEM FOR FAST APPROXIMATE REGION BISECTION

CROSS-REFERENCE TO RELATED APPLICATION

This application is a continuation of and claims benefit to U.S. application Ser. No. 15/934,898, filed Mar. 23, 2018, for entitled "Method and System for Fast Approximate Region Bisection", which is incorporated by reference herein.

FIELD OF THE INVENTION

The present disclosure generally relates to the field of computational geometry, particularly to dividing an area into approximately equal sub-divisions with minimal perimeters.

BACKGROUND

Conventional methods for subdividing one spatial region into multiple smaller regions include both manual and automatic methods. Manual methods involve decisions by humans about where boundaries between sub-regions will fall. In automated methods, boundaries are set by processes performed by machines, such as digital computers.

Boundary-drawing activities are known to be motivated by any of numerous different concerns. For instance, in the field of geospatial information systems (GIS), it is desirable to have the ability to automatically organize management zones based on arbitrary spatial properties. That is, regions that have similar properties and are in the same general contiguous area may be grouped into a single "zone." For example, in the case of a farmer's field, it may be desirable to group crops of a particular type into a single zone. More particularly, where a farmer uses aerial and/or satellite imagery to observe conditions in the field, multiple images are sometimes merged into a single, continuous visualization.

However, where there is a large homogeneous region, the result may be a single zone that is too large to efficiently manage on its own. Accordingly, it is often desirable to subdivide one zone into multiple smaller zones, to facilitate more effective management. However, the time and effort necessary to manually subdivide GIS zones can be large. Moreover, with an ever-increasing volume of data being made available, the need for automation is persistently increasing. It is also difficult to divide the space into sub-regions of equal parts, each having the minimum perimeter length.

Another class of problems is known to arise in the domain of democratic politics, where much attention has been dedicated to studying the practice of gerrymandering, by which those empowered to set boundaries for electoral districts are believed to seek to influence electoral outcomes by reshaping the electoral districts within a state. Critics of gerrymandering have drawn attention to the elongated and contorted shapes of electoral districts said to characterize the practice. Some have argued that principles of fairness and sound public policy weigh in favor of grouping voters together with their neighbors, rather than permitting politicians to create voting districts that are hand-picked from across far-flung parts of the state. However, the boundaries of a state, like the boundaries of a farmer's field, are not always defined by simple shapes or straight lines. Moreover, quantities of interest (e.g., eligible voter populations, crop varieties, etc.) are not always distributed evenly.

FIG. 1 illustrates a region 101 having an arbitrary shape. In some contexts, it is desirable to subdivide arbitrarily shaped regions such as the region 101 into multiple sub-regions. It is likewise desirable to ensure that no sub-region exceeds a predetermined area size, e.g., a given number of pixels to be displayed on a digital display, or a manageable area for a farmer's crops. It is also desirable that the resulting sub-regions are compact, having as minimal a perimeter as possible. After the region 101 is subdivided into more manageable sub-regions, and a user may be enabled to more effectively review, analyze, and act on information conveyed in the data.

FIG. 2 illustrates one conventional method (the "naive" method) for subdividing region 101, wherein region 101 is repeatedly divided into sub-regions oriented along a single axis, such as the x- or y-axis. In particular, in FIG. 2, region 101 is split into vertical sub-regions 201a, 201b, 201c . . . 201n, where n is an arbitrary integer. In one version of the naive method as shown in FIG. 2, the first sub-region 201a, and each succeeding sub-region 201b, 201c, etc. has the same predetermined width w, up until the last subdivision 201n. In a case where the predetermined sub-region width divides integrally into the overall width of region 101, then the last sub-region 201n will have the same width as the other sub-regions. Alternatively, as shown in FIG. 2, where the width of region 101 is not an integer multiple of the predetermined sub-region width w, the last subdivision 201n has a smaller width. Due to variations in the height of region 101 across its width, the height of the respective subdivisions 201a to 201n also varies. Accordingly, depending on the overall shape of the region 101 to be subdivided, the area of each subdivision may be different.

The conventional naive method has several downsides. As mentioned, it is possible for the area of each subdivision to vary dramatically. This can undermine the goal of having relatively uniform regions. Also, the sub-regions are not compact, and the perimeters of each are longer than they would need to be. Also, without more information, it is unknown whether the x- or y-axis is a meaningful axis for splitting. For instance, in the case of aerial imagery of a farmer's field, the orientation of the region may be based on how the image was collected (e.g., the flight path of a drone), which might not have any useful relationship to the intended organization of information of an analyst reviewing the data. Further, since the naive method only cuts in one direction, it tends toward always making long, skinny zones (or, alternatively short, fat zones). In many cases, the long, skinny (or short, fat) zones created by the naive method are undesirable.

FIG. 3 illustrates the result of a second conventional method (the "fishnet" method) for subdividing region 101, wherein region 101 is repeatedly divided at intervals along the x- and y-axes, which generally creates squares, except along the edges of the region 101. In FIG. 3, region 101 is split vertically and horizontally to form subdivisions 301a, 301b, 301c . . . 301n, where n is an arbitrary integer. Where region 101 completely occupies an interval in both dimensions, the resulting sub-zone has a rectangular shape. Where the region fills less than the entire interval in either dimension, the resulting subregion may have a non-rectangular shape. For example, 301n has a triangular shape.

The fishnet method has several downsides. For one, there is a likelihood that at least some of the zones will be quite small, i.e., much smaller than the desired unit of analysis for a zone. In other words, although the resulting zone is below a threshold size, the resulting zone is so small, that it becomes inefficient for use. As the number of such excessively small zones multiplies, the issue is exacerbated. Hence, the fishnet method has been criticized widely by users of GIS software systems including conventional products that employ the fishnet method.

Accordingly, there is a desire to solve these and other related problems.

SUMMARY

In accordance with methods and systems consistent with the present invention, a method in a data processing system is provided for subdividing a region, comprising receiving data representing the region by the data processing system, and determining a centroid of the region. The method further comprises determining a minor axis of the region that crosses through the centroid, and dividing the region along the minor axis into a first sub-region and a second sub-region.

A data processing system configured to subdivide a region is provided, comprising a memory storing instructions configured to cause a processor to receive data representing the region into the memory, and determine a centroid of the region. The instructions further cause the processor to determine a minor axis of the region that crosses through the centroid, and divide the region along the minor axis into a first sub-region and a second sub-region. The processor is configured to execute the instructions.

A method in a data processing system is provided for subdividing a region, comprising receiving data representing the region by the data processing system, and determining a centroid of the region. The method further comprises determining a minor axis of the region that crosses through the centroid, and dividing the region along a line parallel to the minor axis into a first sub-region and a second sub-region.

DETAILED DESCRIPTION

Methods and systems in accordance with the present invention automatically subdivide an area having an arbitrary shape into multiple sub-regions that have approximately equal area under a particular threshold, with compact shapes having minimal perimeter length. These systems input an arbitrarily shaped zone and recursively bisect it until all of the new zones are smaller than the threshold.

The system subdivides a two-dimensional region, such as a digital image of a landmass. The data processing system loads the region into memory and a target area threshold for the sub-regions, and determines the centroid (or center of mass if the area was considered a mass) of the area. The system then determines a minor axis of the region that runs through the centroid, and splits the region along the minor axis into a first sub-region and a second sub-region. If the sub-regions are less than the threshold, the resulting sub-regions are outputted. If not, each sub-region is further divided into smaller sub-regions by repeating the process on that sub-region (i.e., determining the centroid and the minor axis running through the centroid and dividing the region in two parts along the minor axis).

In one implementation, the sub-regions are each assessed with respect to a condition and the steps of the process are repeated until all resulting sub-regions satisfy the condition. In some implementations, the condition is a threshold size for the area of each of the resulting sub-regions. In some methods, the condition is a threshold number for the population residing within each of the resulting sub-regions. Consistently compact sub-regions are achieved by splitting along the minor axis. The resulting regions are compact, having small perimeter-to-area ratios. The region is recursively bisected until one or more metrics are met for each region. The metrics may be, for example, area, density, count, population or any other suitable measurement.

In one implementation, it is not necessary that the regions have precisely equal areas. Instead, with an eye toward efficiency and practicality, a process that executes quickly (even with some degree of variation in the resulting areas of regions) may be preferable to a process that consumes significantly more memory and CPU time to create two sub-regions having more precisely matched areas.

Figure 4:
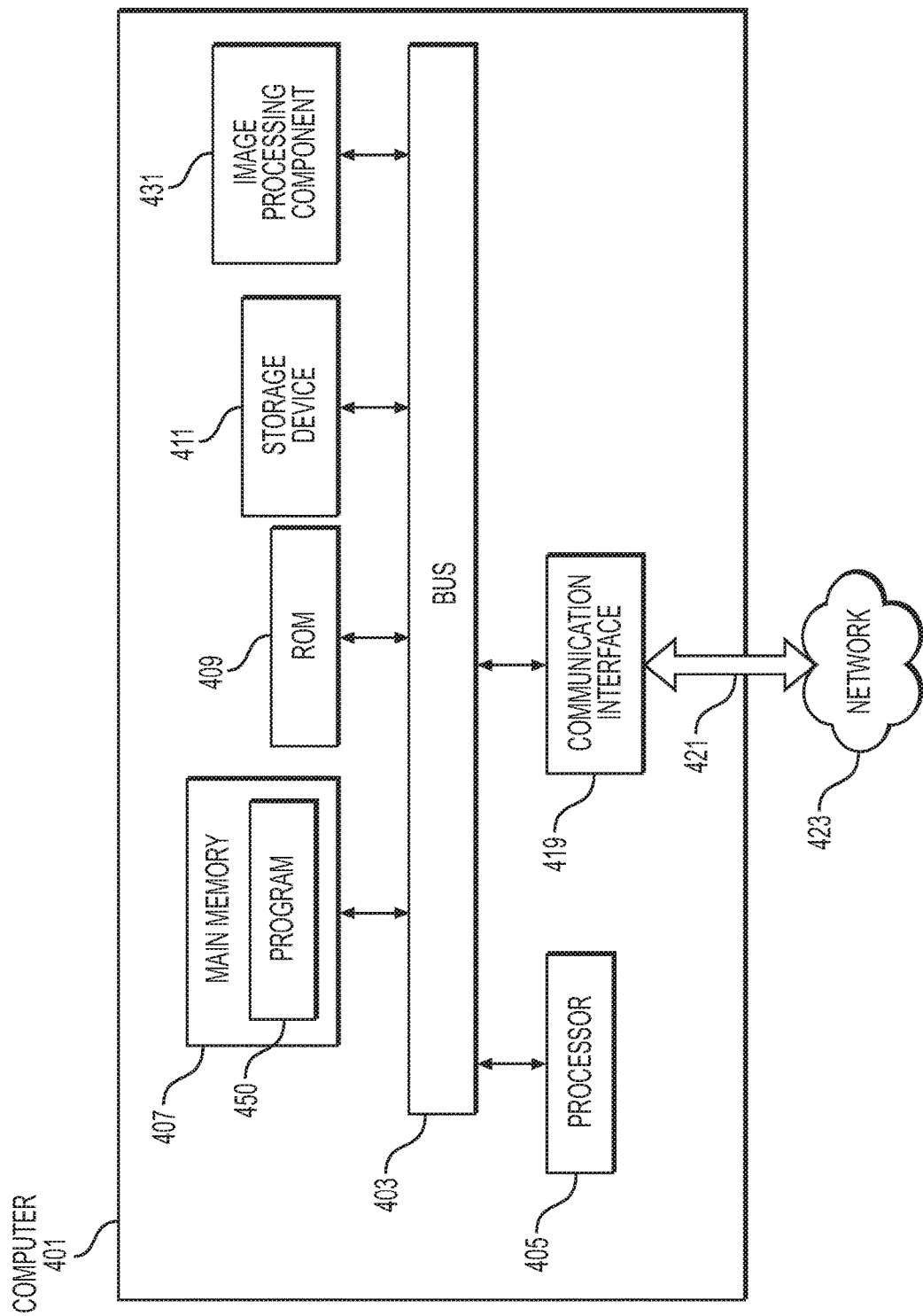
FIG. 4 is a schematic view of a computing device according to an embodiment.

FIG. 4 illustrates an exemplary data processing system, namely a computer system 401 consistent with systems and methods of the present disclosure. Computer 401 includes a bus 403 or other communication mechanism for communicating information, and a processor 405 coupled with bus 403 for processing the information. Computer 401 also includes a main memory 407, such as a random access memory (RAM) or other dynamic storage device, coupled to bus 403 for storing information and instructions to be executed by processor 405. In addition, main memory 407 may be used for storing temporary variables or other intermediate information during execution of instructions to be executed by processor 405. Main memory 407 includes a program 450 consistent with methods and systems of the present disclosure. In various embodiments, main memory 407 includes a plurality of addressable memory locations. Computer 401 further includes a read only memory (ROM) 409 or other static storage device coupled to bus 403 for storing static information and instructions for processor 405. A storage device 411, such as a magnetic disk, flash drive, or optical disk, is provided and coupled to bus 403 for storing information and instructions. Computer 401 may be a personal computer, a server, a laptop, a smartphone, a wearable device, a mobile device, a tablet, smart glasses, or any other such device equipped with appropriate input, output, and processing capabilities.

According to one embodiment, processor 405 executes one or more sequences of one or more instructions contained in main memory 407. Such instructions may be read into main memory 407 from another computer-readable medium, such as storage device 411. Execution of the sequences of instructions in main memory 407 causes processor 405 to perform the process steps described herein. One or more processors in a multi-processing arrangement may also be employed to execute the sequences of instructions contained in main memory 407. In alternative embodiments, hard-wired circuitry may be used in place of or in combination with software instructions. Thus, embodiments are not limited to any specific combination of hardware circuitry and software.

Although described relative to main memory 407 and storage device 411, instructions and other aspects of methods and systems consistent with the present invention may reside on another computer-readable medium, such as a floppy disk, a flexible disk, hard disk, flash drive, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Computer 401 also includes a communication interface 419 coupled to bus 403. Communication interface 419 provides a two-way data communication coupling to a network link 421 that is connected to a network 423, such as a local area network (LAN), the Internet, or other computer network. Wireless links may also be implemented. In any such implementation, communication interface 419 sends and receives signals that carry digital data streams representing various types of information. In one implementation, computer 401 operates as a web server on a network 423. Computer 401 may also represent other computers on the Internet, such as users' computers having web browsers, and the user's computers may have similar components as computer 401.

Figure 1:
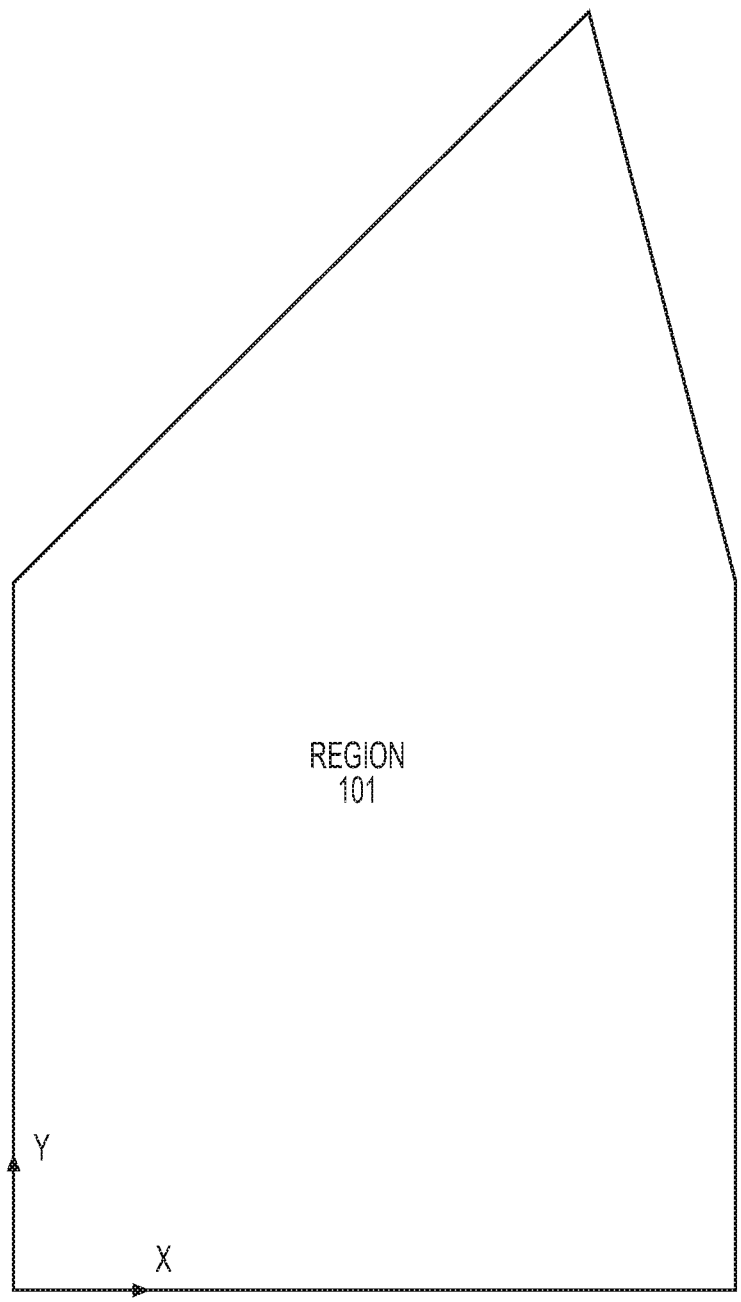
FIG. 1 depicts a two-dimensional region having an arbitrary shape.
Figure 2:
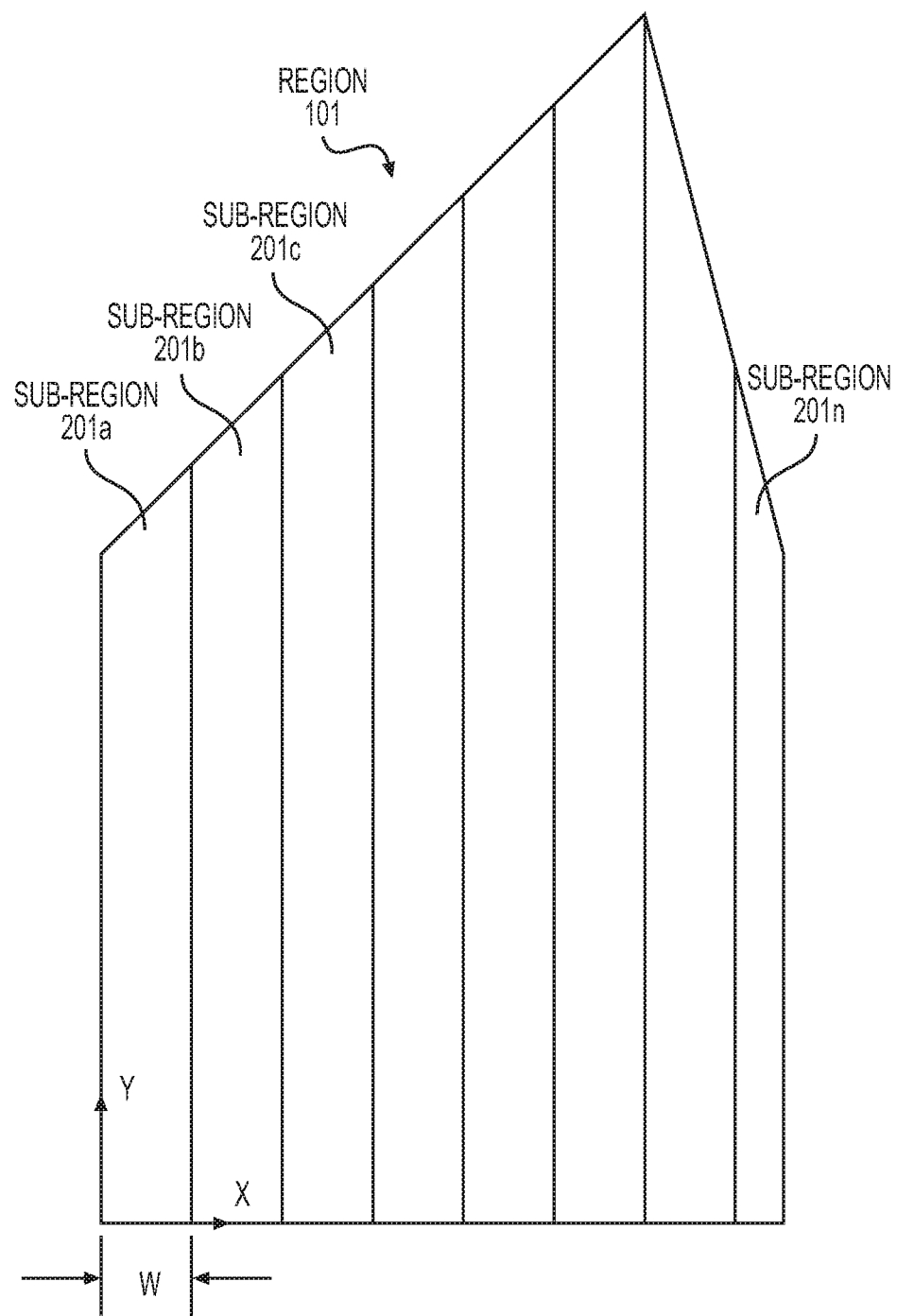
FIG. 2 depicts a result of a first conventional method for subdividing the region of FIG. 1.
Figure 3:
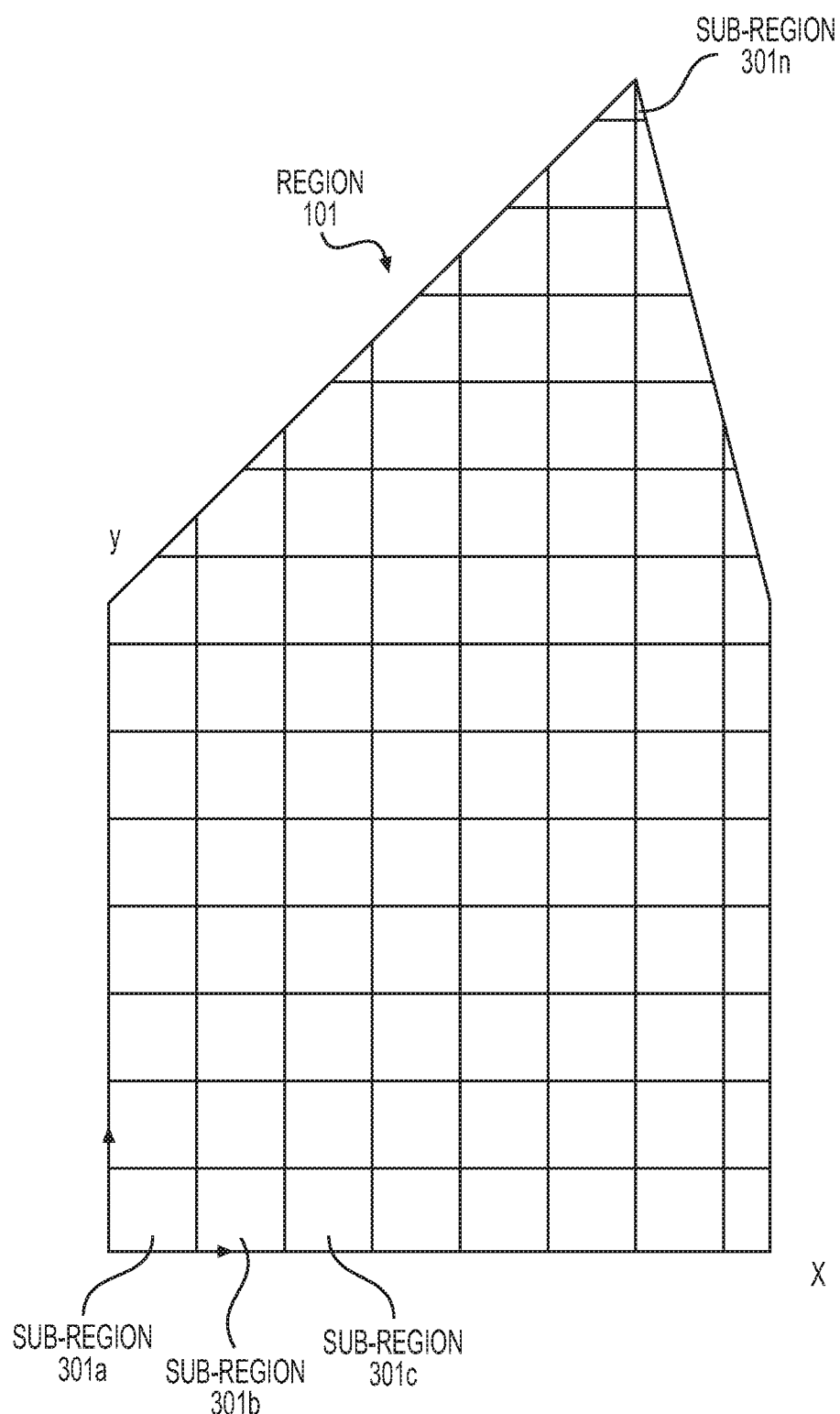
FIG. 3 depicts a result of a second conventional method for subdividing the region of FIG. 1.
Figure 5:
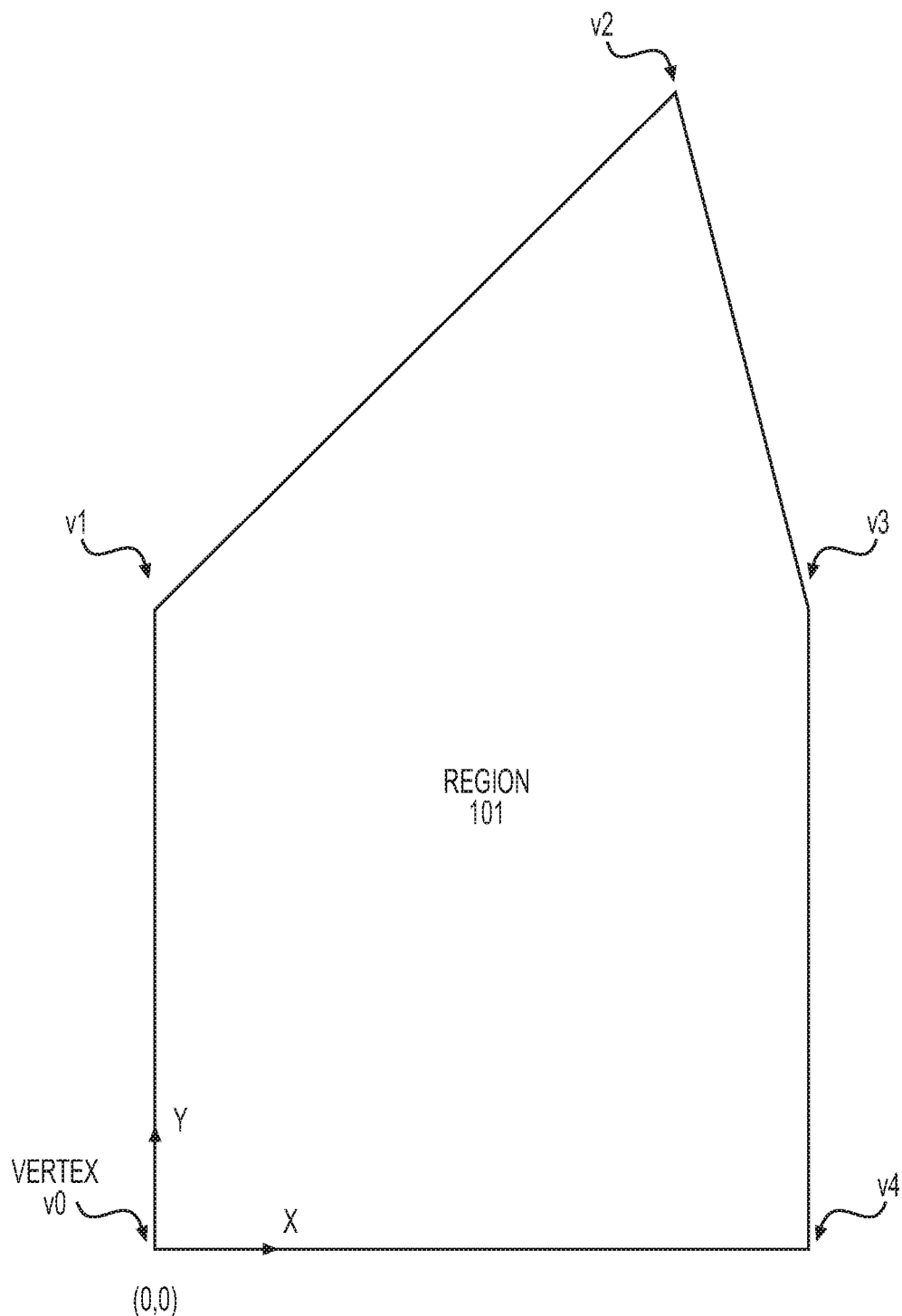
FIG. 5 illustrates the region depicted in FIG. 1 on which the process is applied.

FIG. 5 shows the region 101 again, for ease of comparison, that was previously shown in FIGS. 1-3. However, embodiments are equally applicable to regions having other shapes and are not limited to the region 101.

Figure 6:
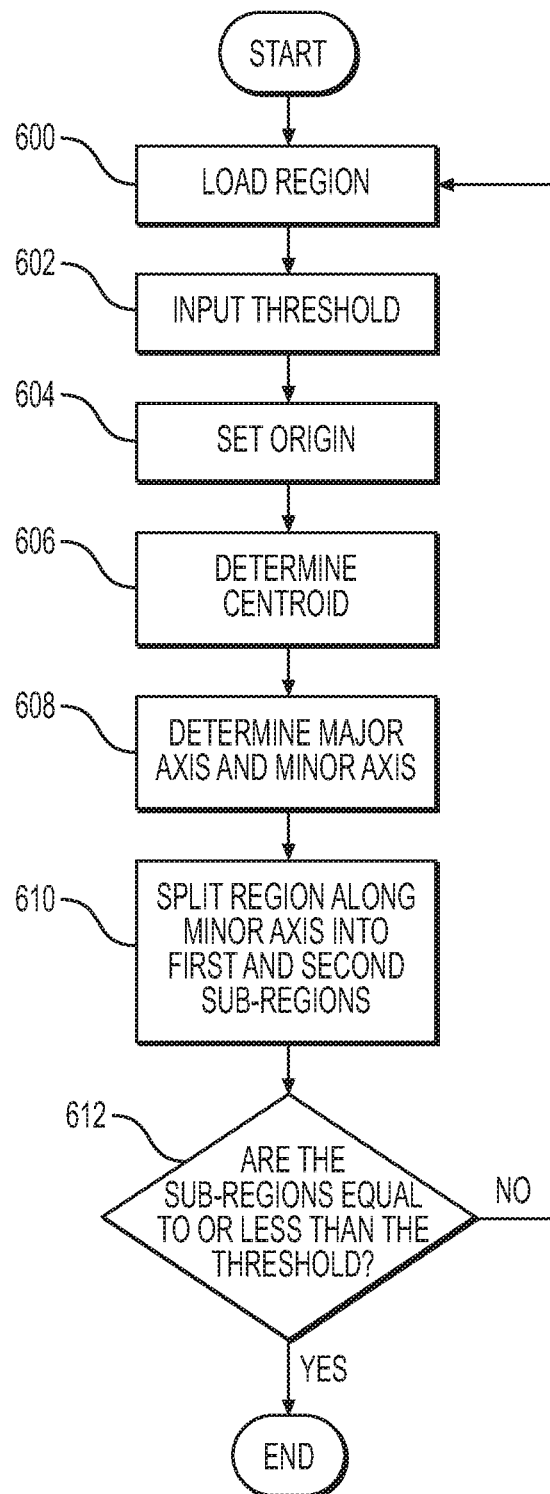
FIG. 6 illustrates a method according to an embodiment.

FIG. 6 shows a flowchart of a process for bisecting a region in accordance with an implementation. First, the region 101 is input and loaded into computer memory 407 (step 600) and a threshold for a desired maximum area size is input or determined (step 602). As shown in FIG. 5, the origin (0,0) is set (step 604). In an embodiment, a vertex (from among the vertices v0, v1, v2, v3, v4) of region 101 is selected as the origin (0,0) of an x and y axis coordinate system. In an embodiment, vertex v0 is selected. However, in other embodiments, another vertex is selected. Although shown as a polygon, the region does not need to be a polygon and may be any shape.

Figure 7:
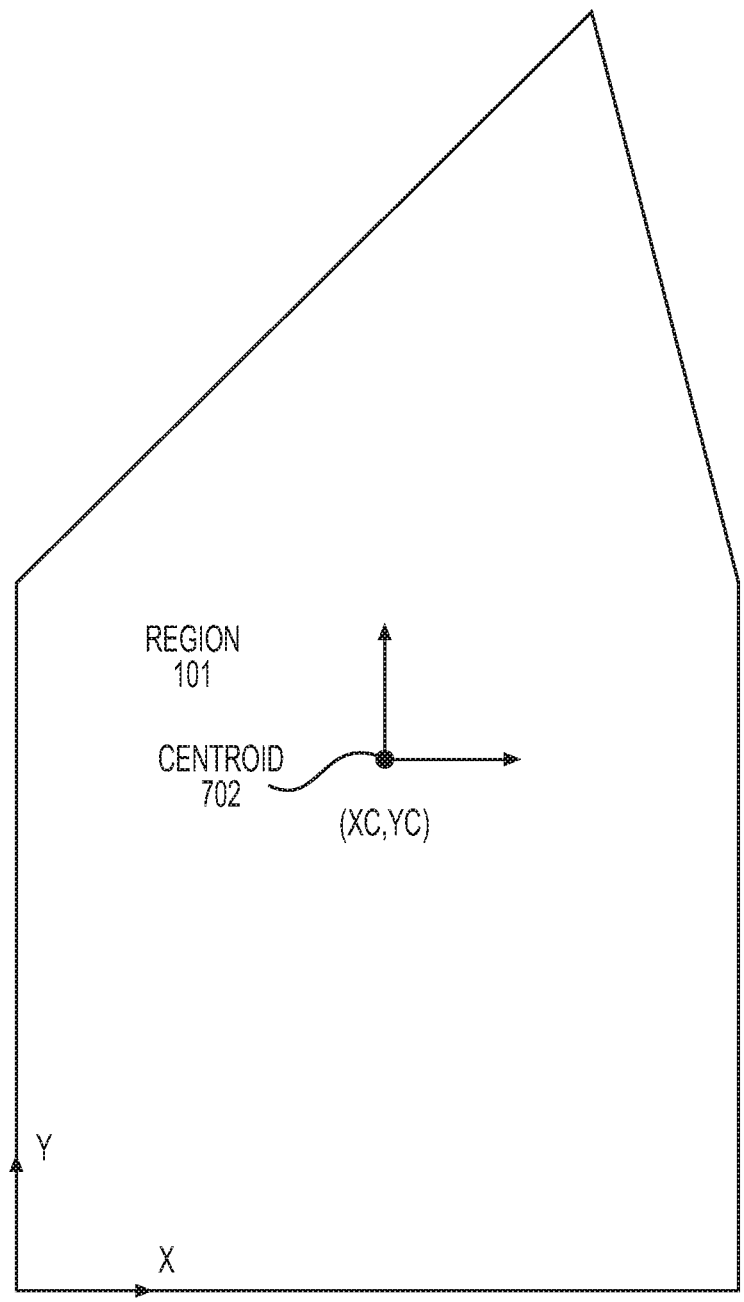
FIG. 7 shows the centroid of the same region.

FIG. 7 shows the centroid 702 of the same region 101. The centroid (xc, yc) of region 101 is determined (step 606). By analogy to solid mechanics, if region 101 is modeled as a prismatic sheet of a material having uniform thickness (i.e., in the z-axis, coming out of the page) and uniform density throughout, then the centroid coincides with the center of mass, i.e., the point at which the region balances on a pinpoint under the influence of a gravitational field acting in the thickness direction (i.e., parallel to the z-axis, perpendicular to the x- and y-axes).

Figure 8:
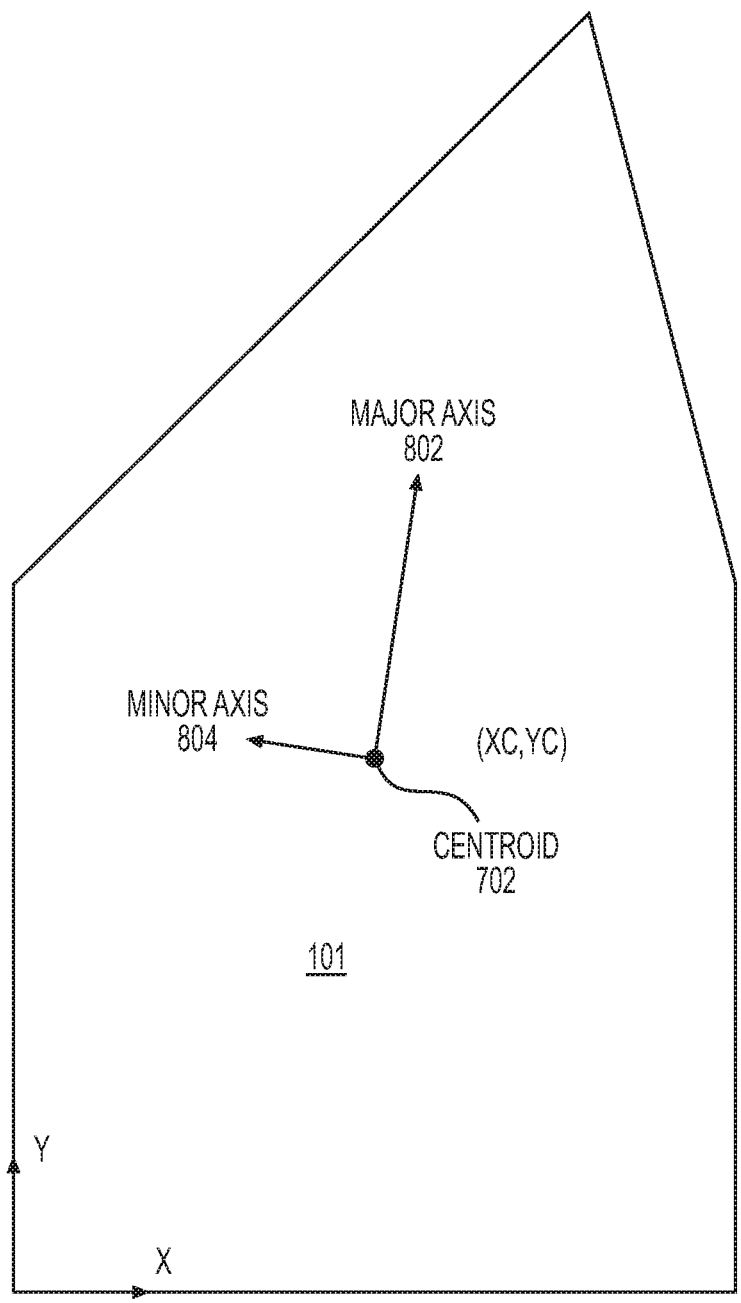
FIG. 8 shows the principle axes of rotation, the major axis and the minor axis.

FIG. 8 shows the principle axes of rotation (major axis 802 and minor axis 804). The system determines the principle axes of rotation, the major axis 802 and minor axis 804 (step 608). The major axis 802 is an axis about which the rotational constant is largest and the moment of inertia is least, and the minor axis 804 is an axis about which the moment of inertia is greatest and the rotational constant is least. The rotational constant is the inverse of moment of inertia. The minor axis 804 and major axis 802 are perpendicular and intersect at the center of mass (or centroid). The major axis 802 corresponds to a direction of maximum elongation in the shape of region 101. The minor axis 804 corresponds to a direction of minimum elongation in the shape of region 101.

Figure 9:
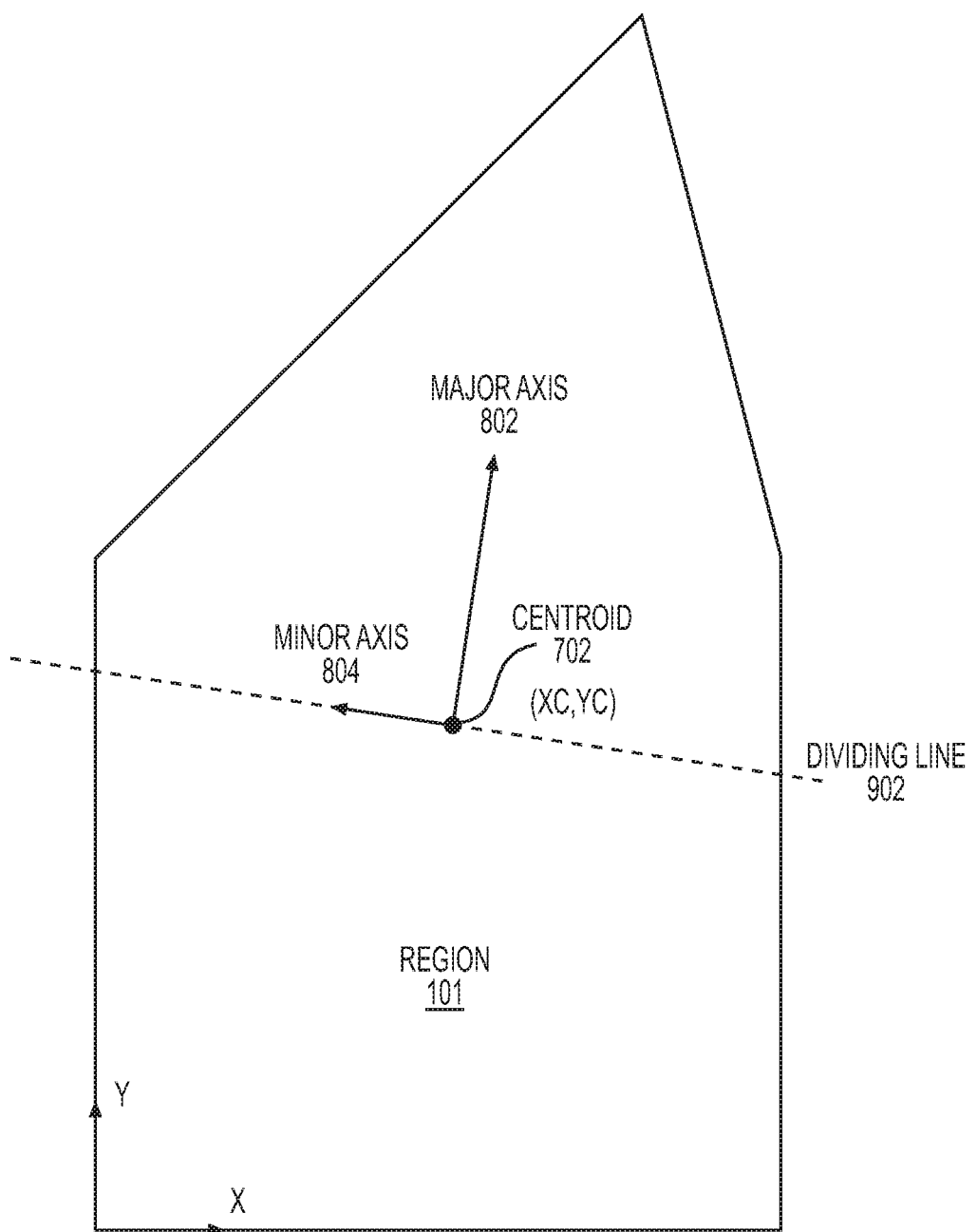
FIG. 9 shows the region bisected into two areas having approximately equal area and compact shape with minimal perimeter.

FIG. 9 shows the region 101 bisected into two areas having approximately equal area, and compact shape with minimal perimeter. The system splits region 101 along the minor axis 804 into new sub-regions A and B (step 610), along the line passing through the centroid ("center of mass") in the direction of minimum elongation. A division line 902 is shown along the minor axis 804.

Figure 10:
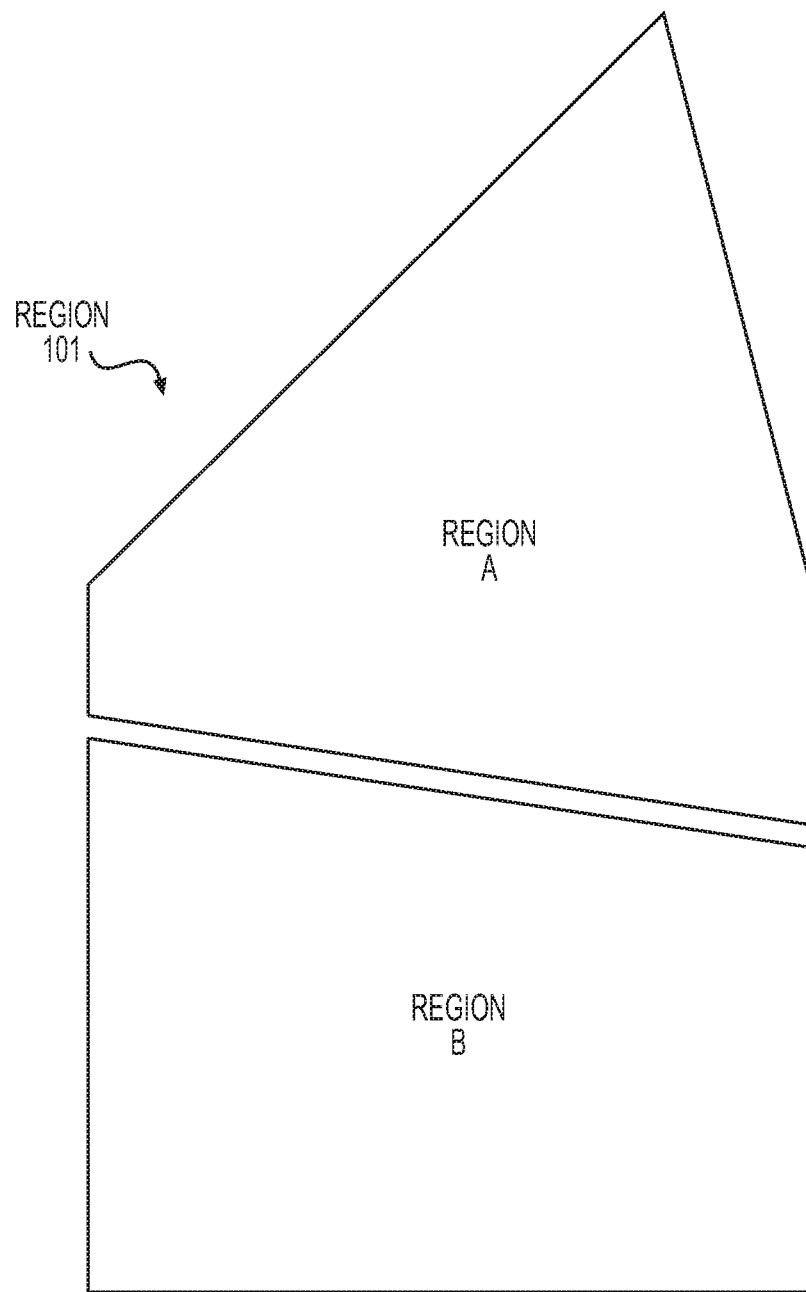
FIG. 10 shows the resulting regions A and B pulled apart with a space between them.
Figure 11:
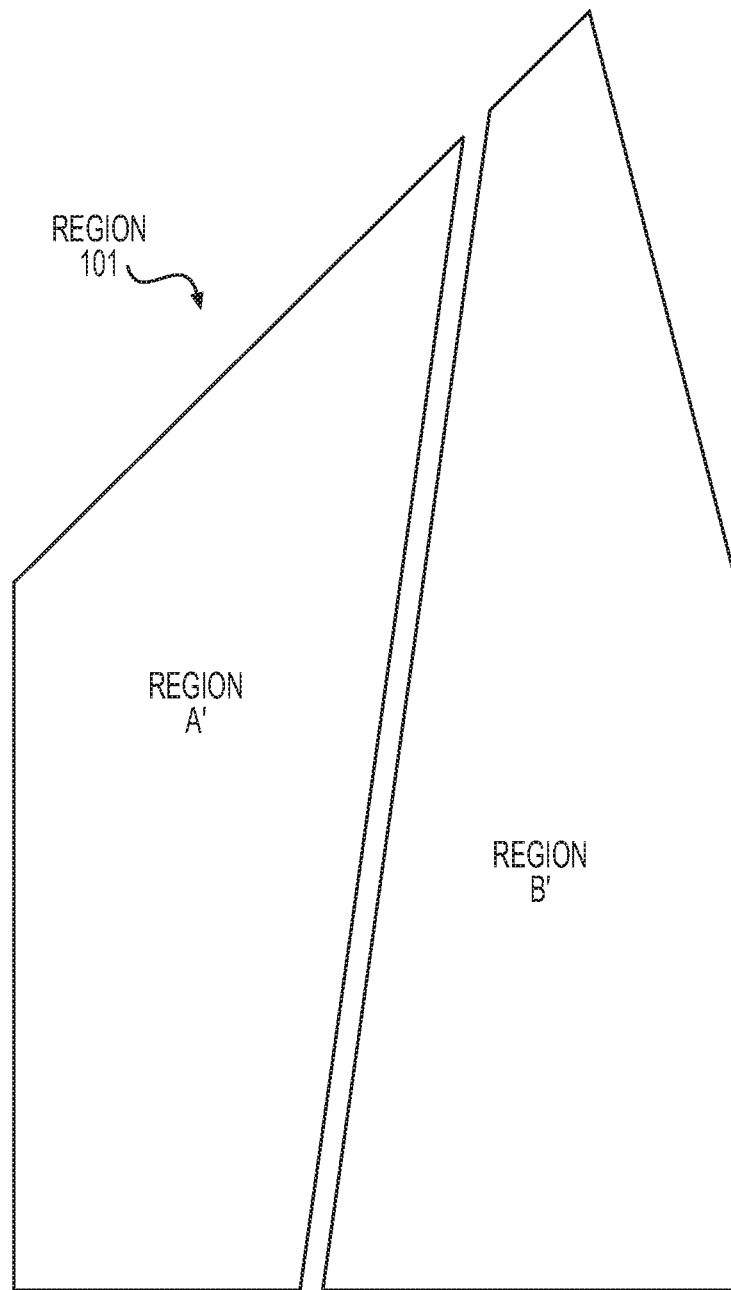
FIG. 11 shows the regions A and B that would have resulted from bisection along a line parallel to the major axis.

FIG. 10 shows the resulting regions A and B pulled apart with a space between them. The resulting regions A and B more square-like and with a minimal perimeter than other regions which could have been obtained by dividing region 101 along a different line. For comparison and in contrast, the regions A' and B' shown in FIG. 11 (again, pulled apart) would have resulted from bisection along a line parallel to the major axis. Regions A' and B' like regions A and B are approximately equal in area, but regions A' and B' are less compact (more elongated) than regions A and B.

The regions A and B are checked to determine whether they are the less than or equal to the desired threshold area (step 612). In some embodiments the threshold is measured in pixel count (e.g., 1 megapixel). In other embodiments, the threshold is measured in units of surface area (e.g., square feet, square meters). In some implementations, the threshold may be something other than area. For example, the threshold may be number of people represented. It is also possible that more than one type of threshold is tested; for example, surface area and number of people represented.

If the regions A and B are not less than the threshold, the process repeats on each sub-region A and B (step 602), to further divide each into sub-regions of approximately equal compact size and minimal perimeter. Each region is split along its minor axis, i.e., along the line passing through the centroid ("center of mass") in the direction of minimum elongation. When repeating, the previous threshold is used and does not need to be input again as in step 602, however.

If the regions A and B are less than or equal to the threshold, the process is complete and the sub-regions are compact, approximately equal size and with a minimal perimeter. The regions may then be transmitted and outputted.

In some embodiments, system evaluates whether each of the sub-regions A and B, respectively, has another characteristic trait as compared to a predetermined threshold. In some embodiments, the threshold is a measure of population (e.g., eligible voters) residing in the sub-region. In such cases, the process continues until each sub-region encloses no more than a predetermined number of eligible voters (e.g., 1,000 eligible voters). The threshold is not always a lower bound. Rather, in some embodiments, the threshold is an upper bound. For example, in some embodiments, the threshold is a measure of population density. In such cases, the process continues until each sub-region has a population density no greater than a predetermined number (e.g., 1,000 eligible voters per square mile).

By action of the process, each of the resulting regions has a reasonably compact shape and also satisfies another constraint, e.g., area, population, or population density. For example, where a constraint is applied with respect to area, none of the resulting regions is excessively large and none of the resulting regions is excessively small. In various embodiments, further subdivision processes according to the same steps are performed recursively on each newly created region until a predetermined criterion for each region is satisfied. The extent of subdivision processes may be limited by any of various criteria. For example, in some embodiments, each region is subdivided until its area falls below a prescribed threshold. In other embodiments, each region is subdivided until a population residing in its boundaries (e.g., number of eligible voters in an upcoming election) meets or falls below a prescribed threshold. By this process, each of the resulting regions is assured to have a compact shape while independently satisfying another constraint, e.g., area or population.

Figure 12:
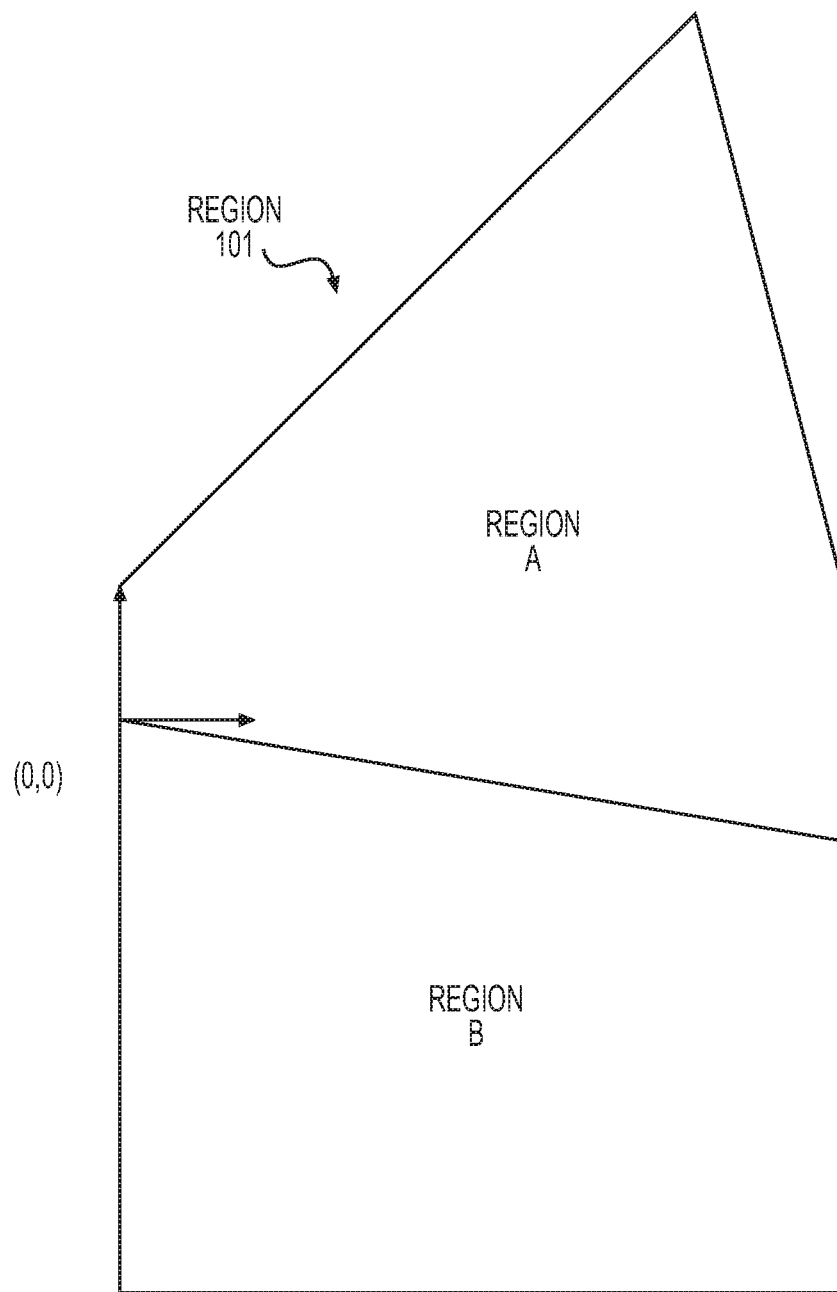
FIG. 12 shows the same region with the bisected sub-regions A and B.

FIG. 12 shows the same region 101 with the bisected sub-regions A and B as above, showing the initiation of the sub-division of the sub-region A when region A is not less than the predetermined threshold. This region A is loaded into memory in substantially the same manner as region 101 was loaded into memory 407 (step 602). The origin (0,0) for region A is set in substantially the same manner as for region 101 (step 604).

Figure 13:
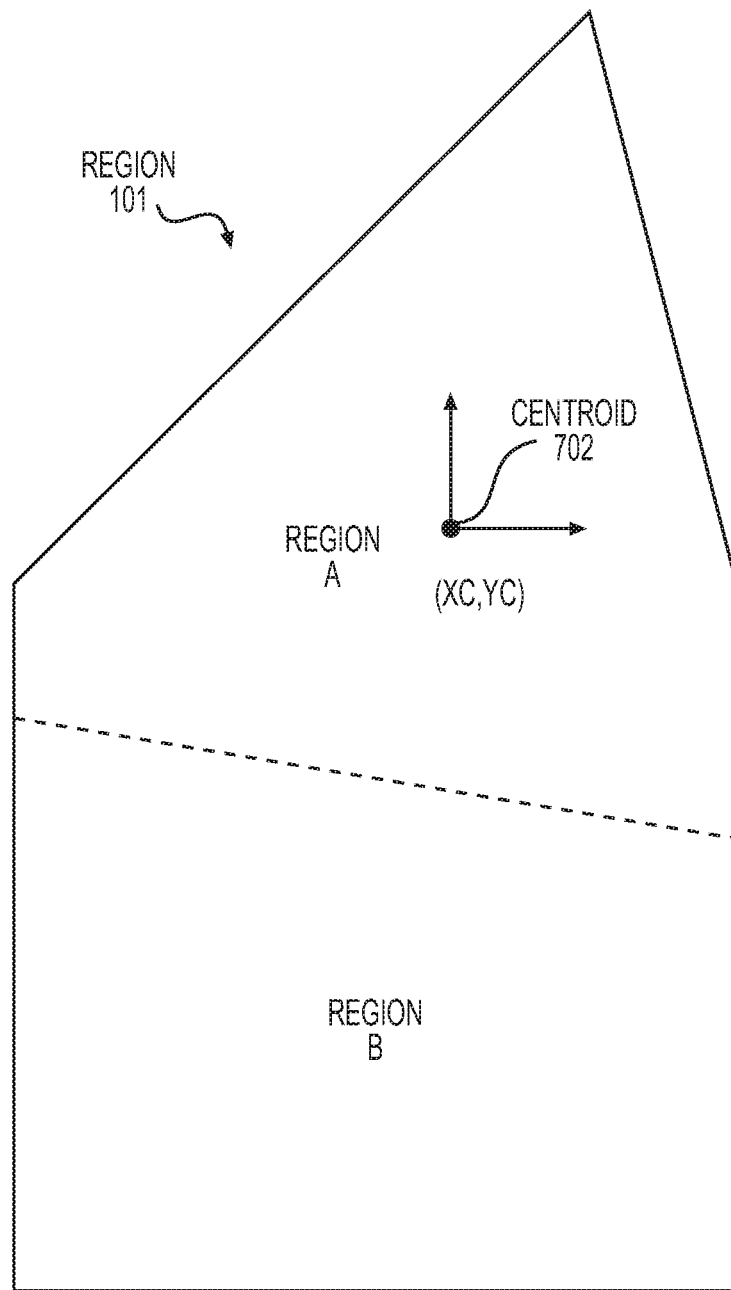
FIG. 13 illustrates the centroid for region A.

FIG. 13 illustrates the centroid 702 (xc, yc) for region A. The centroid 702 is determined in substantially the same manner as for region 101 (step 606).

Figure 14:
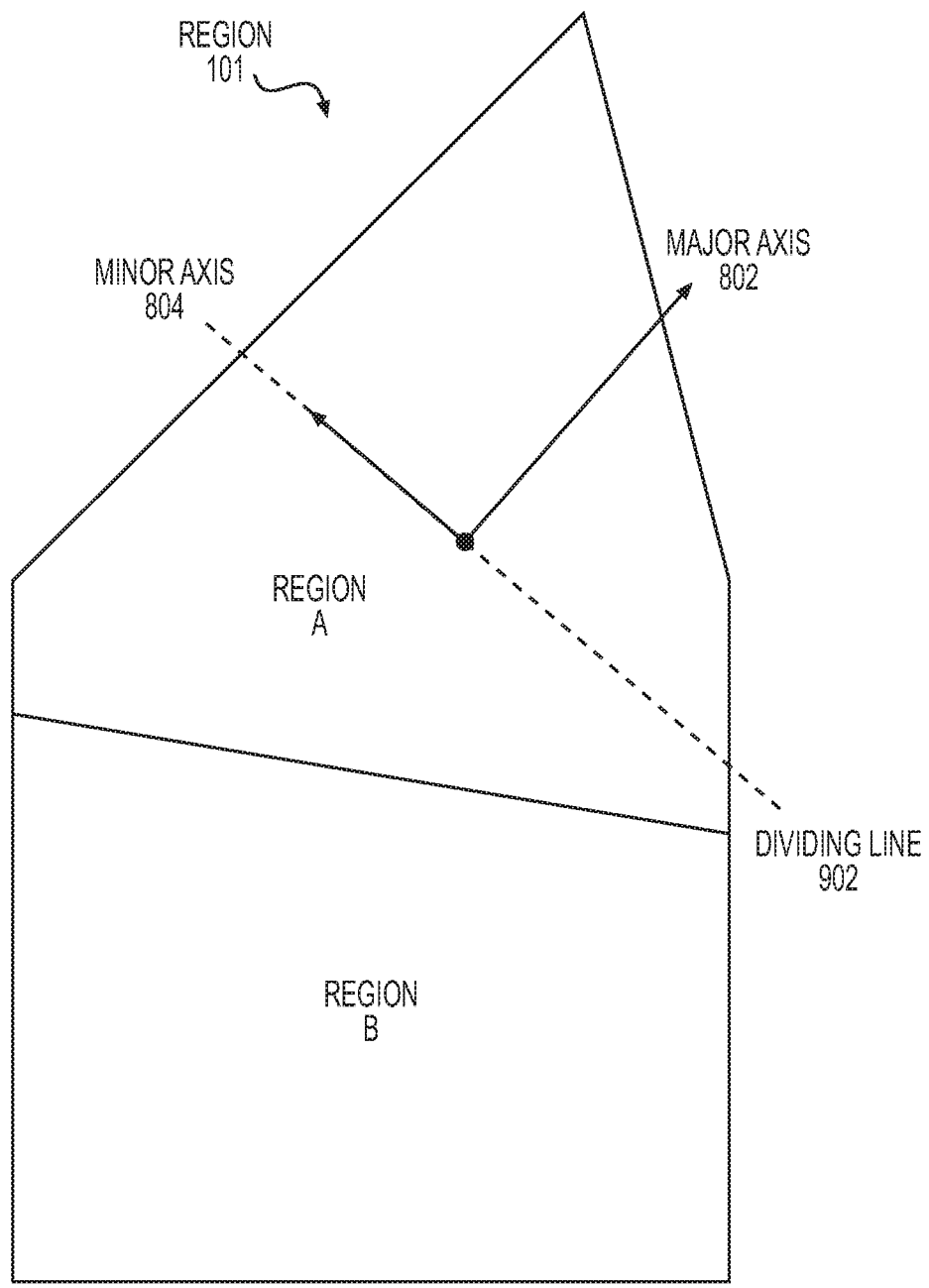
FIG. 14 shows the principle axes of rotation, the major axis and minor axis 804, for region A.

FIG. 14 shows the principle axes of rotation (major axis 802 and minor axis 804) for region A. These axes are determined for region A in substantially the same manner as for region 101 (step 608).

Figure 15:
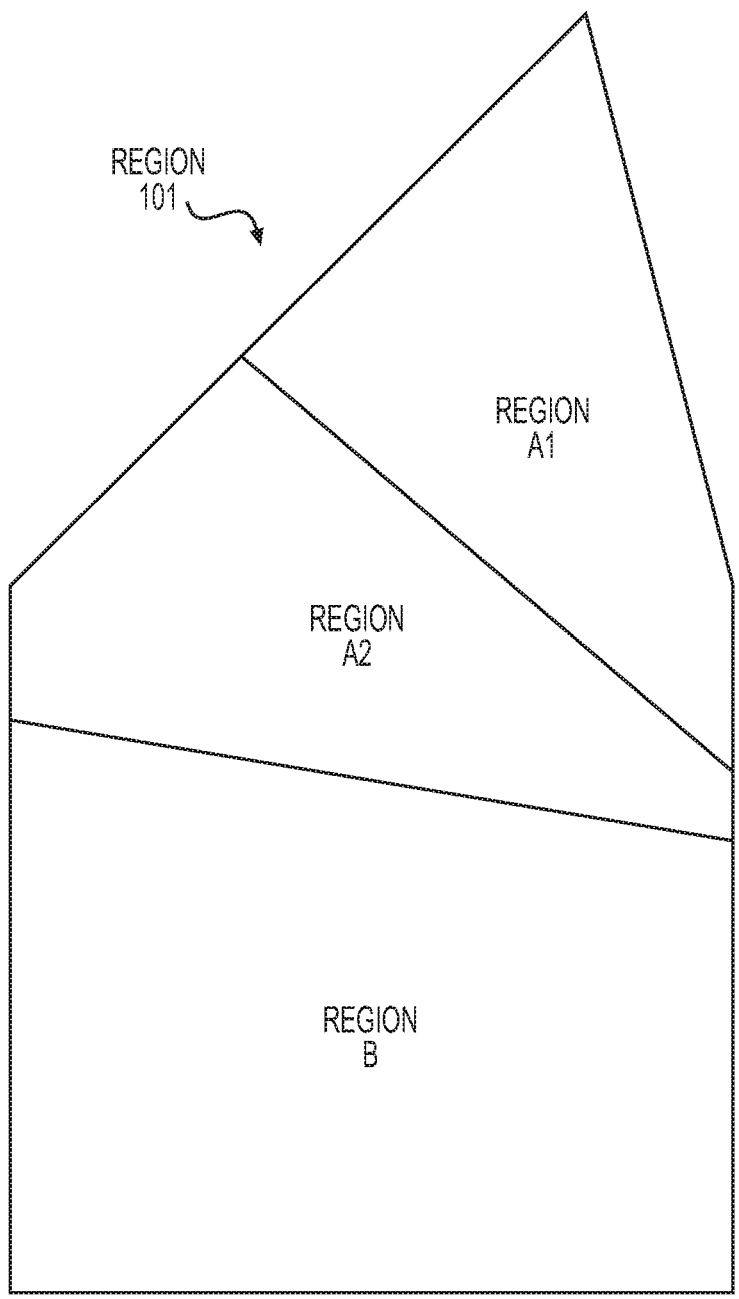
FIG. 15 depicts region A split along the minor axis into new sub-regions A1 and A2.

FIG. 15 depicts region A split along the minor axis into new sub-regions A1 and A2. The system divides the region A along the minor axis 804 into two compact sub-regions of approximately equal area and minimal perimeter (step 610).

The sub-regions A1 and A2 are evaluated to determine if they are equal to or less than the threshold. If they are not, the process is repeated for each sub-region A1 and A2. The same process is applied to region B as well as region A.

Figure 16:
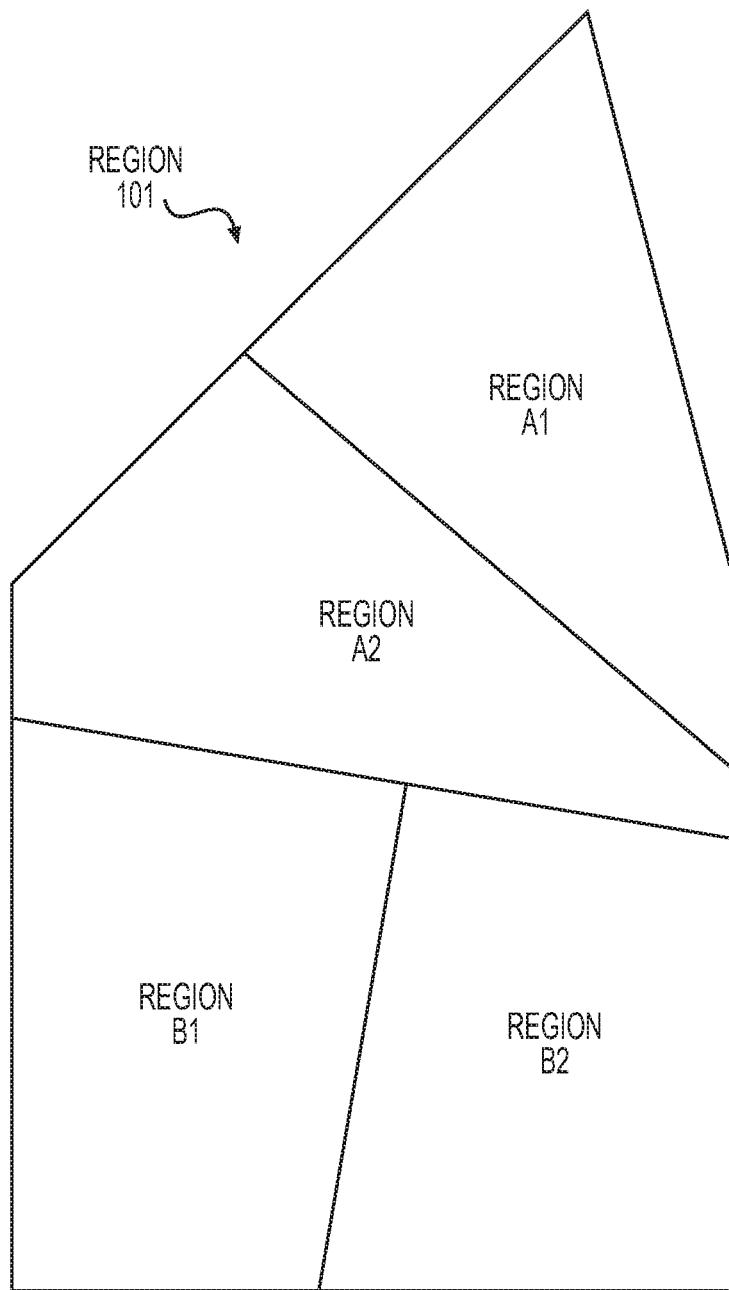
FIG. 16 shows the result after region A has been divided into regions A1 and A2 and region B has been divided into regions B1 and B2.

FIG. 16 shows the result after region A has been divided into regions A1 and A2 and region B has been divided into regions B1 and B2.

Figure 17:
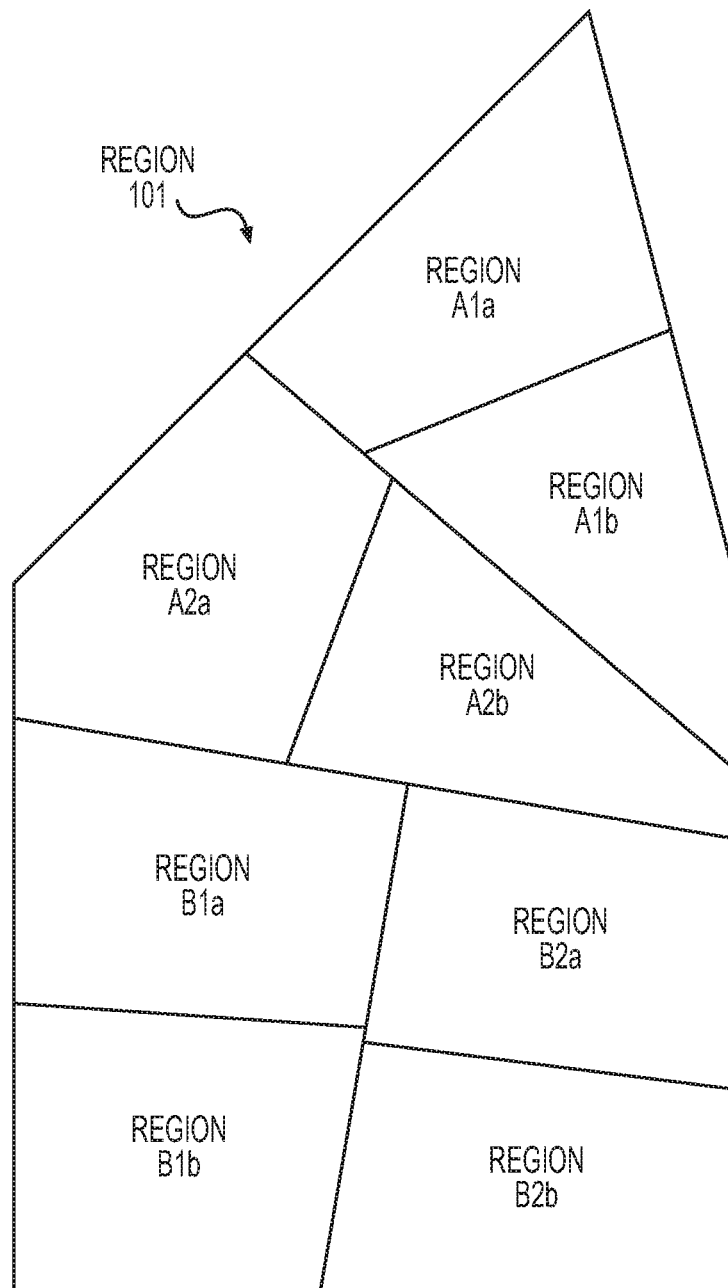
FIG. 17 shows the result of further divisions of regions A1, A2, B1 and B2.

FIG. 17 shows the result of further divisions of regions A1, A2, B1 and B2.

Figure 18:
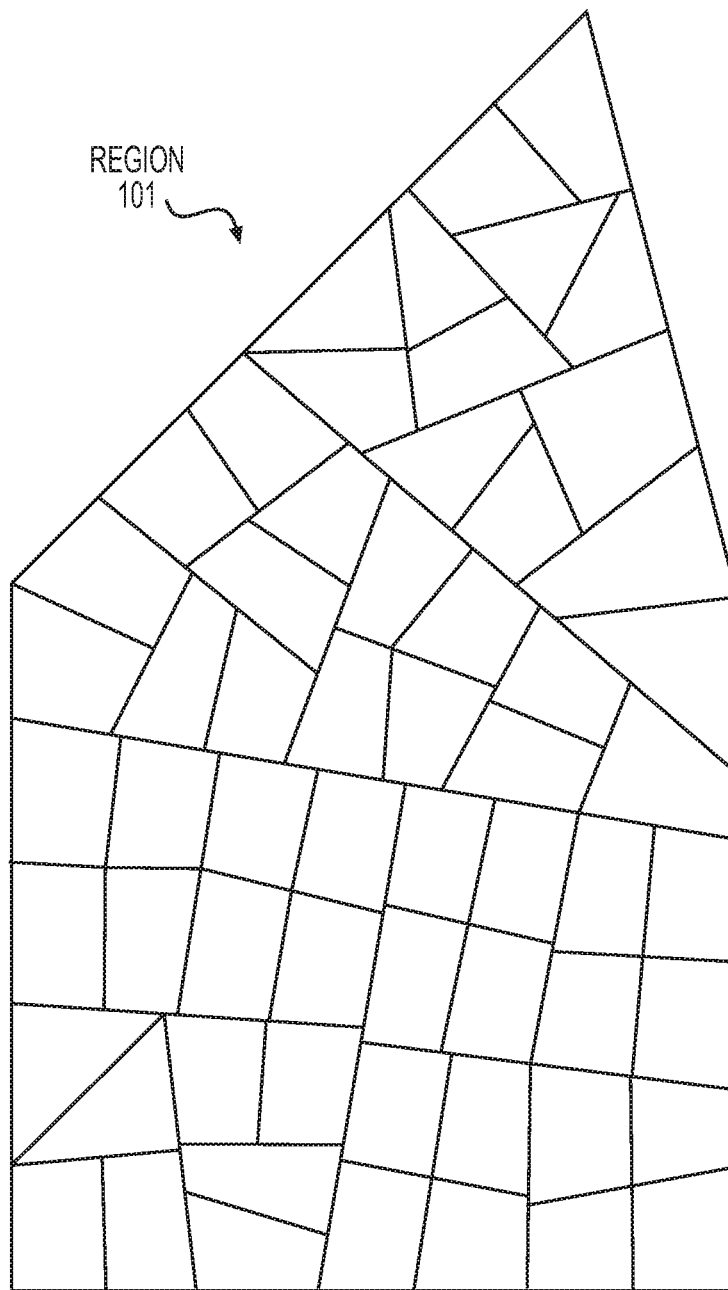
FIG. 18 shows the result of still further divisions after the regions have been divided smaller than the predetermined threshold.

FIG. 18 shows the result of still further divisions of region 101 after the regions have been divided smaller than the predetermined threshold. The extent of such divisions is not limited, and for initially large datasets, may be likewise large.

In another embodiment, instead of dividing along the minor axis 804, the system creates a line parallel to the minor axis and measures the areas on both sides of the line. If the areas are not equal, it moves the line (still parallel to the minor axis 804), and re-measures the two areas again to determine if they are equal. It repeats this process until the areas are equal or approximately equal. This embodiment is typically slower than the embodiment in which the region is bisected along the minor axis to begin with, although the areas of the two bisected regions may be more precisely equal in some instances.

In some embodiments, one step is performed on a local device and another step is performed on a remote device. For example, in an embodiment the loading the region in a computer memory is performed on a personal computer and on a server, the determining a minor axis is performed on the server, and the minor axis is returned by the server to the local computer. In other embodiments, other steps are performed by other combinations of local and remote devices.

In another implementation, the bisection may not be exactly along the minor axis, but a variation from it. Although the optimal angle to cut is the minor axis, there may be cases where another angle close to the minor axis is desirable. For example, a farmer's field may have an irregular shape because of natural features, but there is one direction in which the rows of crops lie. In this case, the cut may be constrained to be along the crop rows' direction or 90 degrees from the crop rows' direction. This implementation may pick the best of those two options at each cut to be as compact as possible given that constraint. This may also be useful in a situation such as the Midwest, where the counties are big and square, or when it is desirable to have voting districts to be aligned north/south or east/west but still be as compact as possible. Any number of discrete angles can be selected to choose from and the one closest to the minor axis is picked as the bisecting axis.

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

What is claimed is:

1. A method in a data processing system for subdividing a region, the method comprising:
   receiving data representing the region by the data processing system;
   determining a centroid of the region;
   determining a minor axis of the region that crosses through the centroid;
   dividing the region along the minor axis into a first sub-region and a second sub-region; and
   recursively dividing the first sub-region and the second sub-region into further sub-regions by, for each of the sub-regions:
      determining a sub-region centroid of the sub-region;
      determining a sub-region minor axis of the sub-region that crosses through the sub-region centroid; and
      dividing the sub-region along the minor axis into a further first sub-region and a further second sub-region.

2. The method of claim 1, further comprising:
   receiving a threshold; and
   determining if the first sub-region and second sub-region are less than or equal to the threshold.

3. The method of claim 2, further comprising:
   transmitting the first sub-region and the second sub-region if the first sub-region and second sub-region are less than or equal to the threshold.

4. The method of claim 1, wherein the threshold is an area size.

5. The method of claim 4, further comprising measuring an area of the first sub-region and an area of the second sub-region to determine each of the areas are less than or equal to the threshold.

6. The method of claim 5, further comprising determining a major axis of the region that that crosses through the centroid and is perpendicular to the minor axis.

7. A data processing system configured to subdivide a region, the system comprising:
 a memory storing instructions configured to cause a processor to:
  receive data representing the region into the memory;
  determine a centroid of the region;
  determine a minor axis of the region that crosses through the centroid;
  divide the region along the minor axis into a first sub-region and a second sub-region; and
  recursively divide the first sub-region and the second sub-region into further sub-regions by, for each of the sub-regions:
   determining a sub-region centroid of the sub-region;
   determining a sub-region minor axis of the sub-region that crosses through the sub-region centroid; and
   dividing the sub-region along the minor axis into a further first sub-region and a further second sub-region; and
 the processor configured to execute the instructions.

8. The data processing system of claim 7, wherein the instructions are further configured to cause to the processor to:
 receive a threshold; and
 determine if the first sub-region and second sub-region are less than or equal to the threshold.

9. The data processing system of claim 8, wherein the instructions are further configured to cause to the processor to:
 transmit the first sub-region and the second sub-region if the first sub-region and second sub-region are less than or equal to the threshold.

10. The data processing system of claim 7, wherein the threshold is an area size.

11. The data processing system of claim 10, wherein the instructions are further configured to cause to the processor to:
 measure an area of the first sub-region and an area of the second sub-region to determine each of the areas are less than or equal to the threshold.

12. The data processing system of claim 11, wherein the instructions are further configured to cause to the processor to:
 determine a major axis of the region that that crosses through the centroid and is perpendicular to the minor axis.

13. A method in a data processing system for subdividing a region, the method comprising:
 receiving data representing the region by the data processing system;
 determining a centroid of the region;
 determining a minor axis of the region that crosses through the centroid;
 dividing the region along a line parallel to the minor axis into a first sub-region and a second sub-region; and
 recursively dividing the first sub-region and the second sub-region into further sub-regions by, for each of the sub-regions:
  determining a sub-region centroid of the sub-region;
  determining a sub-region minor axis of the sub-region that crosses through the sub-region centroid; and
  dividing the sub-region along the minor axis into a further first sub-region and a further second sub-region.

14. The method of claim 13, further comprising:
receiving a threshold; and
determining if the first sub-region and second sub-region are less than or equal to the threshold.

15. The method of claim 14, further comprising:
transmitting the first sub-region and the second sub-region if the first sub-region and second sub-region are less than or equal to the threshold.

16. The method of claim 14, further comprising:
adjusting a position of a dividing line parallel to the minor axis to change the first sub-region and second sub-region.

* * * * *